United States Patent [19]

Caretta

[11] Patent Number: 5,261,979
[45] Date of Patent: Nov. 16, 1993

[54] PROCESS FOR MANUFACTURING A TIRE WITH A BEAD CORE HAVING A HEAT SHRINKABLE COVER

[75] Inventor: Renato Caretta, Gallarate, Italy

[73] Assignee: Pirelli Coordinamento Pneumatici S.p.A., Milan, Italy

[21] Appl. No.: 811,140

[22] Filed: Dec. 20, 1991

[30] Foreign Application Priority Data

Dec. 21, 1990 [IT] Italy .................. 22502 A/90

[51] Int. Cl.⁵ .................................. B29D 30/48
[52] U.S. Cl. .................. 156/130.7; 152/539; 152/540; 152/565; 156/132
[58] Field of Search .......... 156/130.7, 132, 460, 156/136, 422; 152/539, 540, 541, 544, 565, 542; 245/1.5

[56] References Cited

U.S. PATENT DOCUMENTS

| | | | |
|---|---|---|---|
| 1,914,040 | 6/1933 | Pierce | 245/1.5 |
| 2,625,980 | 1/1953 | Castricum | 156/132 |
| 2,952,293 | 9/1960 | Billingsley | 152/540 |
| 3,106,952 | 10/1963 | Rudder | 152/540 |
| 3,949,800 | 4/1976 | Lejeune | 152/540 |
| 4,854,361 | 8/1989 | Gasowski et al. | 152/543 |
| 4,922,985 | 5/1990 | Gasowski et al. | 152/543 |
| 5,007,471 | 4/1991 | Maiocchi | 152/540 |

FOREIGN PATENT DOCUMENTS 1151359  2/1982  Italy .
2064442  6/1981  United Kingdom .

Primary Examiner—Michael W. Ball
Assistant Examiner—Richard Crispino
Attorney, Agent, or Firm—Stevens, Davis, Miller & Mosher

[57] ABSTRACT

In the manufacture of a tire having a metal bead core, a covering structure (6) is associated with each bead core, which structure consists of a sheet (7) made of unvulcanized elastomeric material wrapped around the bead core and a strip of unvulcanized rubberized fabric (8), reinforced with heat-shrinkable material cords, wound around the elastomeric material sheet (7). The bead cores (3) are subsequently assembled with other tire components, and afterwards a tire vulcanization step is carried out. During this step the chemical bonding between the elastomeric sheet (7) and the bead core (3) is achieved, which bonding is promoted by the simultaneous shrinkage of the cords provided in the rubberized fabric strip (8).

7 Claims, 1 Drawing Sheet

PROCESS FOR MANUFACTURING A TIRE WITH A BEAD CORE HAVING A HEAT SHRINKABLE COVER

BACKGROUND OF THE INVENTION

The present invention relates to a process for manufacturing a tire for vehicle wheels and more particularly to a tire designed to be mounted on heavy transport motor-vehicles.

As used throughout this specification, the word "axial" refers to a direction generally parallel to the axis of rotation of the tire and the word "radial" refers to a direction generally perpendicular thereto.

The present tire is provided with a carcass comprising two beads each defined along an inner circumferential edge of the tire for securing it to a corresponding mounting rim. The carcass also comprises a pair of annular reinforcement cores, usually referred to as bead cores, each fitted in one of the beads, each bead core consisting of a plurality of coils of bare metal wire disposed in axial side by side relation and radially superposed, the wires being tightly packed together so as to form bead core having a transverse polygonal cross section, the bead core being then enclosed in a covering structure. There is a filler or apex strip of elastomeric material extending along the outer circumferential edge of the bead core and radially tapering away from the tire axis. In addition, the carcass has a supporting structure consisting of at least one ply of rubberized fabric reinforced with textile or metal cords, extending axially from one bead to the other and having its edges folded back about the bead cores and the fillers.

It is known that the engagement between a tire and the respective wheel rim is generally achieved by means of areas extending circumferentially within the tire and generally referred to as "beads". Generally inserted in each tire bead is a so-called "bead core" performing the double function of giving the appropriate non-deformability character to the bead when the tire is being used and holding the end edges of the carcass ply or plies which are folded back around the bead core itself. The above-mentioned elastomeric filler is of substantially triangular section and has the function of stiffening the tire bead and filling the space left empty between the carcass plies the folded or turned up end portions thereof.

Each bead core is an annulus formed by a plurality of wire coils usually of metal material, disposed in axial side by side relation and radially superposed so as to give the desired geometrical configuration to the bead core when seen in cross section.

In tubeless tires, that is those without an inner tube, the bead, and specifically its reinforcement bead core, constitute a particularly critical element in the tire.

In fact, due to the absence of an inner tube, a rim of one piece construction, that is the so-called "grooved rim" or drop center type is required to act as an air-tight coupling between the tire beads for the purpose of maintaining the inflation pressure in the tire.

The rim is provided with bead retaining radially outwardly extending flanges. It is possible to carry out the mounting of a tire on the rim and the dismantling therefrom by making the tire bead override the retaining flanges by means of a slight oval conformation given to the bead on one side with on the diametric opposite side the bead is in a drop center position or well formed in the axial center part of the wheel rim.

To achieve air-tightness between the tire and the rim, the rim is provided with bead seats which are radially inclined towards the outside by an angle of 15° relative to the tire axis; during the tire inflation the inflation pressure urges the beads to slide axially towards the outside on said inclined surface of progressively increasing diameter and, since the reinforcement bead core is circumferentially inextensible by itself, as a result this sliding brings about a tight fit between the bead and the rim, so that the elastomeric material interposed between the bead core and the bead housing is compressed, thereby achieving air tightness between the tire and the rim.

However, to properly achieve this tight fit a bead core is necessary in which its surface facing the rim is substantially parallel to the base of the bead, that is, also inclined by 15° relative to the rotational axis of the tire and axially extending over at least 50% of the axial width of the bead itself.

In order to comply with this requirement, bead cores having a polygonal, rhomboidal or hexagonal cross section have been long provided and they consist of a pack of coils of bare metal wire, disposed in axial side by side relation and radially superposed, such as for example the bead core disclosed in the U.S. Pat. No. 3,949,800, the disclosure of which is hereby incorporated by reference.

This type of bead core is very flexible since the coils of bare wire can be easily displaced relative to one another and therefore it can be easily made oval so that the assembling and disassembling of the tire from the rim can be easily achieved.

On the other hand, however, these bead cores, due to the fact that they are made of coils of bare wire, have some serious drawbacks as compared with the usual bead cores made of rubberized wire, which drawbacks reduce the useful lifetime of the tire.

First of all they have a weak shape stability and specifically weak torsional resistance so that during the molding and vulcanization step of the tire, under the thrust of the vulcanization pressure and the pulling action exerted by the carcass plies, their polygonal cross section loses its starting geometrical form which should be rigidly shaped and take a different form which is basically round, in particular at the side facing the rim, thereby diminishing its axial width and varying the inclination thereof relative to the desired one, that is 15°.

As a result of this deformation the tire bead is unable to withstand the stress to which it is submitted in use over an extended period of time; in particular, also due to the reduced height of the rim flange, the tire bead during use begins to rotate about its radially inner and axially outer edge thereby causing detachment from the bead base resting on the rim bead seats, starting from a relatively small point and progressively going on over an increasingly greater portion with the result that its structural strength is impaired.

A second drawback originates from the fact that the rubber/metal bonding on the bare metal, as in the case of the concerned bead core, is difficult to obtain and does not possess high mechanical strength, so that, as time goes by, breakage of the bonding interface can take place in the tire in use and, as a result, the bead core can be separated from the bead, which then involves the necessity to replace the tire within a short period of time.

In order to avoid the first drawback, that is bead core deformation during the vulcanization step, in accordance with the known art a bare bead core is incorporated into a shell of elastomeric material and a partial vulcanization of the assembly is carried out before applying the bead filler and inserting the bead core in the carcass of the tire being manufactured.

However while this partial vulcanization on the one hand exerts a sufficiently stiffening action on the bead core which is therefore capable of going through the tire vulcanizing step without undergoing important deformations, on the other hand the partial vulcanization adversely affects not only the rubber/metal bonding between the shell and the bead core but also the rubber/rubber bonding between the partial vulcanized shell surface and the other bead elements still in a raw (unvulcanized) state, thereby further impairing a situation which is already critical.

These types of bonding are not even improved by the final vulcanization step, since the bonding interfaces have already reached stabilization during the previous partial vulcanization step.

In particular, rubber in the raw (unvulcanized) state, as is known, has some adhesiveness. This adhesiveness is used for joining together the different rubber parts constituting the tire, not only mechanically but also from a molecular point of view during the final vulcanization step. Unfortunately in this case the adhesiveness of the rubber shell covering the bead core is reduced, sometimes even to zero, due to the preceding partial vulcanization step and therefore it substantially reduces the capability of the rubber shell to be properly coupled and bonded with the elastomeric material of the bead filler and the other surrounding rubberized fabrics.

As a result, it is necessary to submit this rubber shell to a solutioning step, in order to give it back, at least partly, the adhesiveness features that it has lost during the partial vulcanization.

In order to obviate this requirement as much as possible, attempts have been made to improve this bonding, in accordance with the teachings contained in British Patent 2,064,442 in the name of the same Assignee (the disclosure of which is hereby incorporated by reference), consisting of covering the rubber shell with a layer of different rubber, optionally incorporating a reinforcement cord structure made of a heat-shrinkable material such as nylon having a different vulcanization rate. In particular, the rubber in the shell, that is in contact with the bead core, has a higher vulcanization rate whereas the rubber in the outer layer has a lower vulcanization rate. Therefore, when the covered bead core is submitted to a partial vulcanization step, the outermost layer substantially remains in a raw state and, as such, is capable of adhering to a greater extent to the surrounding rubber parts, which are in a raw state also, during the final vulcanization step.

Alternatively, in accordance with the teachings of the Italian Patent No. 1,151,359 in the name of the same Assignee (the disclosure of which is hereby incorporated by reference), the shell has been replaced with a rubberized fabric strip reinforced with textile cords preferably of nylon; then a second rubberized fabric covering reinforced with cords made of heat-shrinkable material preferably consisting of a fabric strip coiled about the taped bead core is applied after the partial vulcanization. In this manner, when the tire is submitted to the final vulcanization step the nylon cords of the second covering become shorter thereby exerting a strong pressure on the first covering and, as a result, the friction between the two concentric coverings brings about a chemical cooperation for the achievement of a sufficient degree of bonding.

On the other hand it is apparent that the shape stability and torsional strength of the bead core section is not at all increased.

These processes solve the problem connected with the rubber/rubber bonding at least partly but do not succeed in substantially improving the weak bonding created between the bead core metal and its shell during the partial vulcanization step.

As regards the increase of the torsional strength of the metal bead core in itself, sections of the wire (some of which are disclosed in the above mentioned U.S. Patent) have been studied that interact with one another so as to make the bead core cross section steadier.

In this connection the Assignee itself has recently offered a brilliant solution to the problem, in accordance with the U.S. Pat. No. 5,007,471, by providing a bead core in which coils made of wire having a hexagonal flattened or elongated cross section are mutually interfitted with coils disposed in side by side relation therewith, with a half-coil staggering, thereby forming a closely packed section that is practically not-deformable both in the axial and radial direction, which will ensure the bead core a very high transverse stability and torsional strength.

In greater detail, in an unmounted tire, that is during the assembling and disassembling step of the tire with and from the rim, the bead wire coils can move with respect to one another giving a high flexibility and deformability to the bead core whereas under the effect of the inflation pressure, that is when the coils are in tension, the bead core becomes stiff, thereby acquiring a practically not-deformable cross section.

SUMMARY OF THE INVENTION

In accordance with the present invention a stronger tire is achieved in connection with a better adhesion between the bead core metal and the elastomeric material rubber covering it, as well as between the rubber forming said covering and the other rubber parts forming the tire bead.

The present invention relates to a process to manufacture a tire for vehicle wheels, said tire being provided with a carcass comprising two beads each defined along an inner circumferential edge of the tire for securing the tire to a corresponding mounting rim, said carcass also comprising a pair of annular bead reinforcement cores which are circumferentially inextensible and each of which is positioned in the corresponding bead, each bead core consisting of a plurality of coils made of bare metal wire disposed axially in side by side relation and radially superposed, said coils being assembled in a tight pack so as to form a polygonal transverse cross section, said bead core being held in a covering structure and being provided, at its radially outer surface, with a bead filler of elastomeric material, said process being characterized in that it comprises the following steps:

covering said metal bead core (3) with a sheet (7) of unvulcanized elastomeric material;

covering said sheet (7) of elastomeric material with a strip of rubberized fabric (8) in a raw state, reinforced with cords (12) of heat-shrinkable material oriented in an oblique direction relative to the circumferential extension of the bead core;

applying a bead filler strip (10) to said covered bead core, along the radial outer surface thereof;

associating said bead core and respective filler with the structure of a tire being manufactured;

vulcanizing said tire in an appropriate mold by a heat process involving application of pressure and heat, so that said cords (12) of heat-shrinkable material, shrinking by effect of heat, may exert a compressive action on said sheet (7) of unvulcanized elastomeric material during the creation of the rubber/metal bonding interface between said coils of bare metal wire and said sheet of elastomeric material.

In accordance with the process of the present invention, a tire for vehicle wheels is achieved which is provided with a carcass comprising two beads each defined along an inner circumferential edge of the tire for securing the tire to a corresponding mounting rim, said carcass also comprising a pair of annular reinforcement bead cores, which are circumferentially inextensible and each of which is positioned in the corresponding bead. Each bead core consists of a plurality of coils of bare metal wire disposed in axial side by side relation and radially superposed, said coils being assembled in a tight pack so as to form a polygonal transverse cross section and said bead core being held in a covering structure.

The tire so made is characterized in that said covering structure comprises:

a sheet of elastomeric material wound by looping it about said pack of metal coils; and a strip of rubberized fabric reinforced with cords of heat-shrinkable material wrapped around said sheet of elastomeric material.

BRIEF DESCRIPTION OF THE DRAWINGS

Further features and advantages will become more apparent from the detailed description of a preferred embodiment of a tire carcass for motor-vehicles, in accordance with the present invention, given hereinafter by way of non-limiting example with reference to the accompanying drawings, in which.

DETAILED DESCRIPTION OF A PREFERRED EMBODIMENT

Figure 1:
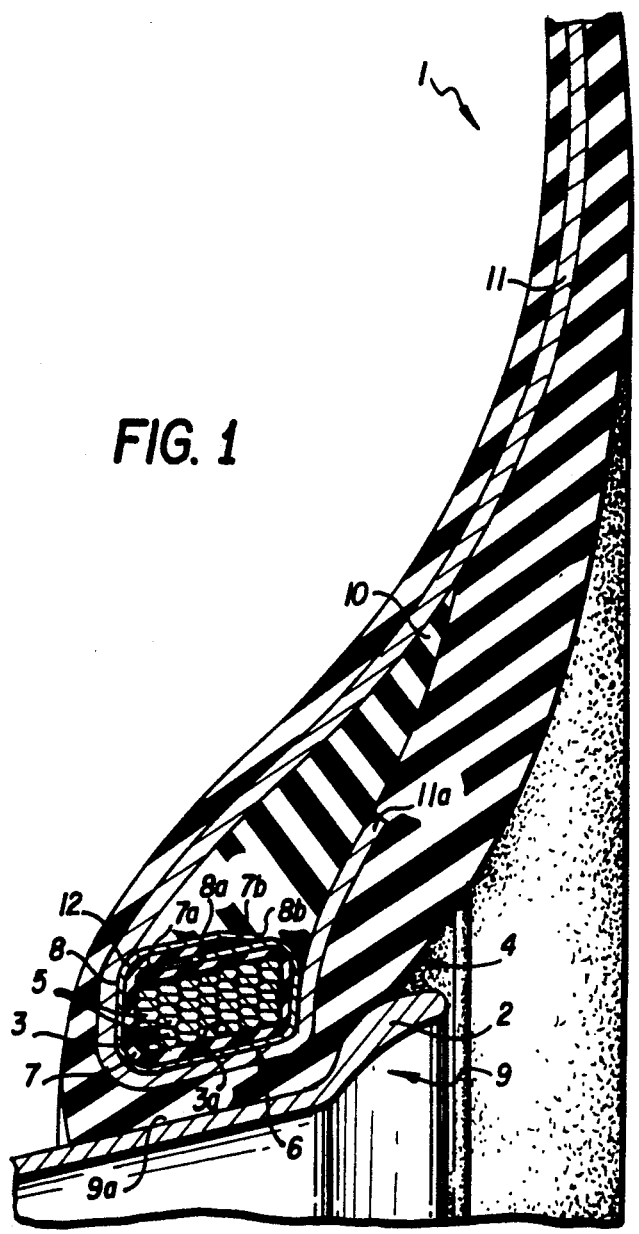
FIG. 1 is a radial cross section taken parallel to the axis of rotation of the tire of the area concerned with one of the tire beads, the other bead being substantially identical and symmetrical with respect to the bead shown.
Figure 3:
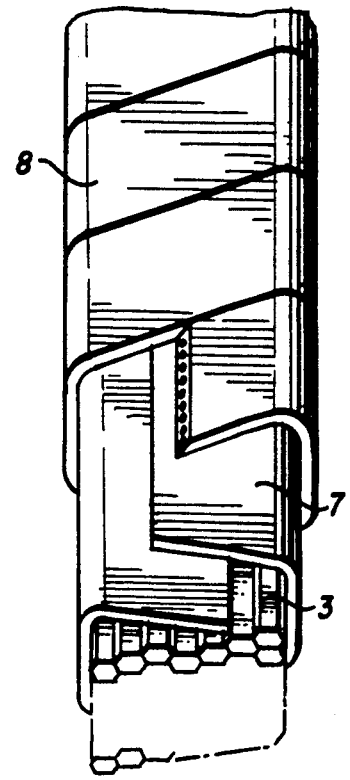
FIG. 3 is a perspective view of a tire bead core (with part of the bead wires in the central part of the core being omitted) showing the bead core covering of FIG. 2 in place on the bead core and a strip wound helically around the covered bead core.

Referring to the drawing, the radially internal portion of the sidewall of a tire for vehicle wheels in accordance with the present inventions generally identified by numeral 1. The tire carcass comprises a pair of bead cores 3 (only one of them is shown), each fitted in a bead 4 defined along the radially inner circumferential edge of the tire. It is at each bead 4 that the engagement of the tire by the mounting rim 9 occurs.

Each bead core 3 consists of a number of metal wire coils 5 disposed in axial side by side relation and radially superposed. In the embodiment shown in which the bead core 3 is associated with a tubeless tire, the coils 5 are disposed so as to form a rhomboid-shaped transverse section. Said section has a base side 3a parallel to the bead supporting seat 9a on the rim 9. In this type of tire the base side 3a and the rim surface 9a are substantially inclined by 15° relative to the tire axis of rotation and the length of side 3a (that is the bead core width) is at least 50% of the axial width of the base of the bead in which the bead core is located.

The bead seat 9a terminates, at its axially outer portion, in a rim flange 2 extending radially outwardly a little beyond the maximum diameter of the bead core side 3a, that is by an amount sufficient to keep the bead in place in its seat when the tire is inflated but that does not hinder the assembling and disassembling of the tire on and from the rim, as stated above.

Preferably the individual coils 5 have a flattened or elongated hexagonal transverse cross section which is capable of giving a high flexibility to the bead core when the tire is dismounted and at the same time a high shape stability and torsional strength to the tire in use.

It is clear that the sizes of said flattened or elongated hexagonal section must be determined (which on the other hand is in accordance with the present state of the art) so that the axial interconnection between coils disposed in side by side relation can give rise to an inclination of the side 3a on the bead core axis which is about equal to the required 15° value.

Figure 2:
FIG. 2 is a cross section of the bead core covering structure in a convenient pre-assembling form before being wrapped around the bead core. It is noted that the remaining tire parts have not been shown as they are conventional.

Each bead core 3 is enclosed in an elastomeric covering structure 6. The covering structure 6 is comprised of a sheet 7 made of elastomeric material of uniform thickness, loop-wise wrapped around the bead core 3, and a strip 8 of rubberized fabric, reinforced with cords 12 of heat-shrinkable material (only one of which is shown in the drawing), which may be either loop-wise wrapped or coiled around the corresponding sheet 7. The term "loop-wise" is intended to mean a wrapping where an elongate strip or tape having a length slightly greater than the circumferential extension of the bead core and a width about 25 to 50% greater than the distance around the periphery of the polygonal cross section of the bead core is applied by placing the central portion of the tape in contact with a surface (3a) of the bead core and then folding the longitudinal sides of the strip or tape around the other surfaces of the bead core so that the longitudinal sides overlap on another surface of the bead core. The filler 10 is then placed over the radially outer surface of the covered bead core, this surface being preferably the area of overlap as shown in FIG. 1. When the strip 8 is loop-wise wrapped around the sheet 7, it is convenient to carry out a pre-assembling of the sheet 7 and strip 8 (FIG. 2) so that the bead covering may be performed by a single looping operation. In this case it is preferable that the two elements should be assembled slightly transversely offset from each other so as to form a nitch or offset portion is provided in at least at a pair of corresponding edges (7a, 8a), preferably both pairs (that is also 7b, 8b) as shown in FIG. 2, although the solution without a nitch or offset can also be used. The bead core is then covered by causing the mutual overlapping of the sheet ends (7b upon 7a) over the portion corresponding to the offset width 7a–8a. so as to be sure that the sheet 7 completely incorporates the metal coils 5 avoiding the risk of displacements between the facing sheet ends, which would leave a free space and the possibility of contact between the metal coils 5 and the rubberized fabric 8. At the same time also the strip 8 ends are mutually overlapped (8b upon 8a) so that the risk of displacement between the fabric borders, which would be prejudicial to the effect of the invention as hereinafter explained, is reduced or eliminated.

Preferably the width of the offset 7a–8a will be about 16 mm, as well as that of the offset 7b–8b, whereas the width of staggering between the ends 8a and 8b of the rubberized fabric 8 will preferably be in the range of 5 mm to 15 mm. In addition, the strip 8 and sheet 7 will be preferably overlapped along the outer circumferential edge of the bead core 3.

It is to be noted that in FIG. 1 the covering structure 6 has been shown so as to highlight the above described arrangement of the sheet and strip edges 7a, 7b, 8a, 8b. Actually, in the finished tire the edges 7a and 7b will form a unitary body together with the elastomeric material present in the strip 8.

The physical and size features of the sheet 7 and strip 8 can vary depending upon the type of motor vehicle for which the tire is designed, as well as upon the operating features to be given to the tire itself.

In particular, the thickness of the elastomeric material sheet will conveniently be in the range of 0.5 mm to 3 mm, these values respectively representing the minimum value to ensure a complete and efficient rubberizing of the outer bead core surface and the maximum permissible value to hold the thickness of the elastomeric material layer which is enclosed (and compressed in use) between the bead core base 3a and the rim surface 9a within correct values, in accordance with the assembling requirements.

As regards the rheometric features, the absolute viscosity (Mooney) of the elastomeric material compound of the sheet 7 in a raw state will conveniently be in the range of 80 to 110, that is higher than that of the strip 8 rubberizing compound that will be included between 50 and 80, the differential between the respective values preferably ranging between 25 and 50 Mooney units.

On the contrary, as regards the strip 8 cords, they are preferably made of nylon and disposed in the fabric as closely as possible with respect to their size. Practically it is convenient to speak of a "filling coefficient" of the fabric, expressed as the percent ratio between the available space and the space actually taken up by the bare (that is not rubberized) cords, the value of which will conveniently be between 30% and 90%, preferably between 50% and 80%.

The fabric sheath 8 must in fact behave like a closed container decreasing in volume during the vulcanization step that does not let the sheet 7 compound penetrate from the inside between two cords disposed alongside each other. It is also contemplated that the fabric sheath or tape may be helically wound around the polygonal periphery of the bead core, over the top of the sheet 7 which is first applied by the above described looping. The cords are then disposed transversely to the circumferential direction of the bead core, substantially parallel to the tire axis when the fabric is helically coiled around the bead core, inclined preferably by an angle in the range of 40° to 50° when the fabric sheath is loop-wise wrapped.

As regards the coiling of the fabric sheath 8 on the bead core the relevant technology is well known and does not deserve a detailed description. It will be sufficient to remember that a cord, or tape comprised of two or more cords, disposed in a longitudinal direction to the tape, is coiled circumferentially about the bead core, around which the sheet 7 has already been loop-wise wrapped, the ends of which are overlapped as already discussed.

Extending along the outer circumferential edge of each of the bead cores 3 is an annular elastomeric bead filler or apex strip 10 which is of triangular cross section and positioned to be radially tapering in a direction extending away from the tire axis.

In a known manner, extending over the whole section of the tire is at least one carcass ply 11 the edges 11a of which are folded back around the bead cores 3 and filler 10.

In accordance with the invention, the process for the manufacture of the above described tire is as follows First of all the sheet 7 of unvulcanized elastomeric material state is loop-wise wrapped around each of the bead cores 3. Then the sheet of unvulcanized elastomeric material 7 is covered with the strip 8 of unvulcanized rubberized fabric, reinforced with nylon cords.

As previously stated, the strip 8 can be coiled helically circumferentially around the sheet 7 or loop-wise wrapped thereabout. In the case in which, as in the drawing, the strip 8 is loop-wise wrapped, it is convenient to join the sheet 7 and strip 8 together before their wrapping around the bead core 3. In this manner it is possible to cover the bead core by a single step. In a preferred embodiment as shown in FIG. 2 the sheet 7 and strip 8 can be coupled so that the respective longitudinal edges are staggered and parallel to each other In this manner the respective longitudinal edges 7a and 7b, 8a and 8b of the sheet 7 and strip 8 are overlapped as previously described and illustrated in the accompanying drawings After the bead core 3 has been covered, the bead filler 10 is applied to the outer circumferential edge thereof.

The subsequent step consists of associating the bead cores 3 with the tire carcass, each core being provided with the respective covering structure and filler 10.

Finally, the tire is vulcanized in an appropriate vulcanization mold, operated by a corresponding press through a heat process characterized by accurate temperature and pressure values and by an exact stay time of the tire in the mold, all that in a known manner and therefore not described in detail; it will be sufficient to remember that a vulcanization step for giant tires of the type which are usually the subject of the invention generally needs a pressure of about 20 bar and a temperature in the range of 130° to 150°, applied for a period of 45 to 60 minutes.

During the last mentioned step the cords of the heat-shrinkable material, due to the absorbed heat, become shorter causing the reduction in volume of the enclosure defined by them and consequently they exert a high pressure on the elastomeric material of the sheet 7, which represents an overpressure relative to the pressure exerted on the carcass by the vulcanization fluid acting within the carcass itself, or rather within the vulcanization chamber, in turn inserted in the carcass to be vulcanized. In accordance with the present invention the action exerted by this overpressure, in combination with the high specific temperature, pressure, and duration time values of the vulcanization cycle has been found to be very efficient to the ends of the achievement of an optimal chemical bonding between the metallic bead core 3 surface and the inner surface of the sheet 7 of elastomeric material, both because it is an overpressure relative to the normal pressure used in vulcanization, and because the sheet 7 wrapped around the bead core 3 is still in a raw state and not partially vulcanized, as is true in the processes of the prior art. It is exactly for the above reasons the one and only pressure that may be exerted by a fabric covering having heat-shrinkable cords during a partial vulcanization step is inefficient for the purpose of achieving a high rubber/metal bonding value.

Obviously also the rubber present in the strip 8, since it is in a raw state, will perfectly adhere to the compound of the sheet 7 and bead filler 10 and to the other rubber parts of the tire carcass thereby accomplishing an excellent rubber/rubber bonding. The present invention attains the intended purposes.

In fact, by virtue of the excellent chemical bonding that has been created between the bead core 3 and sheet 7, possible detachments between the bead core and the rubber incorporating it are practically eliminated in a tire in use, which brings about an increase in the tire lifetime, particularly as regards the possibility of retreading it. Obviously the more the cross section of the bead core is torsionally resistant and permanently of steady shape, the more the invention is advantageous, since the reduced thickness of the elastomeric material sheet, differently from the case of the partially vulcanized shells having a great thickness, is not capable of efficiently compensating for any excessive deformability of the bead core section during the vulcanization step.

Obviously modifications and variations can be made to the invention as conceived, all of them falling within the scope of the inventive idea and as defined in the attached claims.

I claim:

1. A process for manufacture of a tire for vehicle wheels, said tire having a carcass comprising two beads each positioned along an inner circumferential edge of the tire for securing the tire to a corresponding wheel mounting rim, said carcass also comprising a pair of annular bead reinforcement cores which are circumferentially inextensible and each of which is positioned in a corresponding bead, each bead core having a plurality of coils made of bare metal wire disposed axially in side by side relation and radially superposed, said coils being tightly packed so as to form a polygonal transverse section, said bead core being held in a two layer covering structure and having a bead filler of elastomeric material on the radial outer surface of said covering structure, said process comprising the following steps:

covering said metal bead core with an inner sheet of unvulcanized elastomeric material by looping said sheet around said bead core;

covering said sheet of elastomeric material with an outer strip of unvulcanized rubberized fabric reinforced with cords of heat-shrinkable material with a filling coefficient between 30% and 90% with the cords oriented in an oblique direction relative to the circumferential extension of the bead core and thereby forming an unvulcanized rubberized fabric structure;

applying said bead filler to the radial outer surface of the unvulcanized rubberized fabric structure surrounding said bead core;

associating said bead unvulcanized rubberized fabric structure surrounding said bead core and its bead filler with the structure of a tire being manufactured;

vulcanizing said tire in an appropriate mold by a process involving application of pressure and heat, the value of said filling coefficient being such that said cords of heat-shrinkable material, shrinking by effect of heat, define a decreasing volume while not allowing the material of the inner sheet to penetrate between adjacent cords and thereby exert an overpressure relative to said vulcanizing pressure on said underlying sheet of elastomeric material to create a rubber/metal bonding interface between said coils of bare metal wire and the surrounding sheet of elastomeric material.

2. The process of claim 1 wherein the looping of said sheet to cover the bead core comprises placing an elongate sheet of elastomeric material on the radial inner surface of said bead core;

folding longitudinal edges of the sheet radially outwardly and then axially inwardly to the bead core so as to surround the periphery of said bead core with a joint between said longitudinal edges being along said radial outer surface.

3. The process of claim 2 in which the covering of said sheet comprises placing an elongate strip of rubberized fabric over the sheet on the radial inner surface of said bead core;

folding the longitudinal edges of the strip radially outwardly and then axially inwardly so as to surround the periphery of the sheet that is shaped around the periphery of the bead core with a joint between said longitudinal edges of said strip overlapping the joint of the sheet on the radial outer surface of the bead core.

4. The process of claim 2 in which the covering of said sheet comprises helically winding a strip of said rubberized fabric around the entire peripheral surface of the bead core.

5. A process according to claim 1 in which prior to the bead core covering step, a step is performed for associating the elastomeric material sheet with the rubberized fabric strip.

6. A process according to claim 5 in which a first and a second longitudinal edge of the elastomeric material sheet is transversely offset relative to a corresponding first and second longitudinal edge of the rubberized fabric strip.

7. A process according to claim 6 in which said first and second edges of the sheet and the strip respectively, are mutually overlapped along the outer circumferential edge of the bead core, on which said bead filler is subsequently disposed.

* * * * *